United States Patent [19]

Shimmel et al.

[11] 4,368,179

[45] Jan. 11, 1983

[54] PROCESS FOR THE OXIDATION OF ALKALI METAL PHOSPHITES

[75] Inventors: Günther Shimmel; Gero Heymer, both of Erftstadt; Hasso Scott, Kerpen, all of Fed. Rep. of Germany

[73] Assignee: Hoechst Aktiengesellschaft, Fed. Rep. of Germany

[21] Appl. No.: 209,845

[22] Filed: Nov. 24, 1980

[30] Foreign Application Priority Data

Nov. 30, 1979 [DE] Fed. Rep. of Germany ....... 2948219

[51] Int. Cl.$^3$ ...................... C01B 15/16; C01B 25/26
[52] U.S. Cl. ................................... 423/315; 423/305; 423/311; 423/641
[58] Field of Search ............... 423/305, 307, 308, 311, 423/312, 315, 641

[56] References Cited

U.S. PATENT DOCUMENTS

| | | | |
|---|---|---|---|
| 3,023,083 | 2/1962 | Rodis et al. | 423/315 |
| 3,449,068 | 6/1969 | Hartlapp et al. | 423/315 |

FOREIGN PATENT DOCUMENTS

| | | | |
|---|---|---|---|
| 877752 | 7/1949 | Fed. Rep. of Germany . | |
| 1002742 | 2/1957 | Fed. Rep. of Germany . | |
| 1911955 | 5/1970 | Fed. Rep. of Germany | 423/312 |
| 1280824 | 9/1970 | Fed. Rep. of Germany . | |
| 1567632 | 10/1971 | Fed. Rep. of Germany . | |
| 76219 | 8/1974 | German Democratic Rep. . | |

OTHER PUBLICATIONS

The Condensed Chemical Dictionary, 1961, p. 838.

*Primary Examiner*—Earl C. Thomas
*Assistant Examiner*—Gregory A. Heller
*Attorney, Agent, or Firm*—Connolly and Hutz

[57] ABSTRACT

The present invention relates to a process for the oxidation of alkali metal phosphites to alkali metal phosphates at temperatures of between 400° and 500° C. To this end, alkali metal phosphites are employed in the form of an aqueous solution or suspension and, if necessary, the alkali metal : P atomic ratio in this feed material is adjusted to a ratio which at least corresponds to the atomic ratio desired for the final product.

More particularly, the solution or suspension is spray-dried in a tower, in a single operational stage, by spraying in a flame zone. Starting material free from alkali metal phosphate and with an alkali metal : P atomic ratio equal to or greater than 3.5 is used for making a trialkali metal phosphate which is obtained in admixture with an alkali metal hydroxide. Starting material which contains from 25 to 45% by weight of alkali metal phosphate, calculated as phosphorus, based on their total phosphorus content, is employed for making alkali metal polyphosphates.

3 Claims, No Drawings

PROCESS FOR THE OXIDATION OF ALKALI METAL PHOSPHITES

The present invention relates to a process for the oxidation of alkali metal phosphites to alkali metal phosphates at temperatures of between 400° and 500° C.

It is known that sodium salts of phosphorus acid, when heated to temperatures above 200° C., decompose, with disproportionation, into a mixture of sodium phosphates of varying composition and into phosphane. It is also known that phosphites can be oxidized to phosphates by suitable oxidizing agents such as chromate, permanganate or hypobromite.

As disclosed in East German Patent Specification No. 76,291, it is not possible to prepare pure tetrasodium diphosphate from disodium phosphite alone; rather, a mixture of disodium phosphite and disodium phosphate must be employed, in which the proportion of phosphite is now allowed to exceed 5-25%. Furthermore sodium nitrate has to be used as the oxidant in almost stoichiometric proportion based on the content of trivalent phosphorus (N:P>0.2), in order to avoid a yellow coloration and unpleasant odor of the end product.

German Patent Specification No. 877,752 describes that an equimolar mixture of anhydrous disodium phosphate and disodium phosphite can be quantitatively converted to tetrasodium diphosphate at temperatures of 400°-450° C. However, the product obtained presents a grey coloration attributable to carbonaceous cracked products formed from organic constituents in the sodium phosphite solution. Only by heating at 900° C. it is possible to obtain a pure white sodium diphosphate.

German Patent Specification No. 877,751 describes working up a sodium phosphite solution with an Na:P atomic ratio of 3:1, in a rotary kiln at 450°-500° C. This operation also results in the formation of a grey-colored trisodium phosphate, which can only be converted to a white product by calcining at 600°-900° C.

Further, it is known from German Patent Specification No. 1,002,742 that alkali metal orthophosphate solutions which contain 0.03 to 5 parts by weight, based on orthophosphate, of alkali metal salts of phosphorus-containing acids in which the electropositive valency of the phosphorus is less than five, can be spray-dried at temperatures of 200° to 500° C., the product then being calcined to give alkali metal polyphosphates. This method however gives end products which have a low bulk density.

A further disadvantage encountered with the process just described (cf. German Patent Specification No. 1,280,824) resides in the fact that decomposition products—some of which are toxic—of the low-valency phosphorus compounds are found again in the end products, and impart an unpleasant odor thereto. To avoid this, it is therefore necessary to spray-dry the phosphate solution conjointly with solutions of oxidizing agents, such as chlorates, nitrates or peroxides, under quite specific conditions; in particular, accurately defined contact times of the two solutions in the spray nozzle must be adhered to, and this entails considerable difficulties in commercial operation.

According to German Patent Specification No. 1,567,632 it is also possible in the process just described to use starting materials which contain up to 3% by weight, based on $P_2O_5$, of organic contaminants.

The present invention now provides a process for the oxidation of alkali metal phosphites or of mixtures of alkali metal phosphites and phosphates which substantially consist of phosphites, wherein feed materials are used without the need to use expensive oxidizing agents, the resulting final products combining a high degree of whiteness with purity.

To this end, the present process unexpectedly provides for the feed material to comprise an aqueous solution or suspension of the alkali metal phosphites alone or of mixtures of alkali metal phosphites and phosphates consisting predominantly of alkali metal phosphites, and after establishment, if desired, of an alkali metal:P atomic ratio in the feed material to a value which corresponds at least to the atomic ratio desired for the final product, for the resulting solution or suspension to be spray-dried in a tower, in a single operation by spraying it into a flame zone, in the presence of an excess of air.

Suitable feed materials comprise more particularly those which contain a predominant proportion, i.e. more than 50% by weight, and preferably 55 to 75% by weight, of phosphorus in its trivalent oxidation level.

In those cases in which the feed materials are converted to a mixture of tri-alkali metal phosphate and alkali metal hydroxide it is necessary to establish in the feed materials an alkali metal:P atomic ratio equal to or greater than 3.5, and in those cases in which alkali metal polyphosphates are the final products desired to be produced, it is preferable to use feed materials which have an alkali metal phosphate content of 25 to 45% by weight, calculated as phosphorus, based on their total phosphorus content.

Even feed materials which contain up to 3% by weight of organic substances, calculated as carbon, based on the phosphorus contained therein, can be employed in the process of this invention without formation of final products which are colored or are contaminated with cracked products.

In other words, it is possible to convert alkali metal phosphite solutions, regardless of their alkali metal:P ratio, to desirable phosphate by establishing, if necessary or desirable, in the solutions the alkali metal:P ratio desired for the final product, namely by admixture of phosphoric acid or of alkali metal hydroxide solution or of a mixture of both.

The present process compares favorably with the prior art in respect of the following points:

(1) The proportion of phosphite in the starting materials can be up to 75% by weight, or even more.

(2) It is not necessary to admix expensive oxidizing agents, such as sodium nitrate or hydrogen peroxide, to the alkali metal phosphite solution.

(3) The final products are free from any yellowish brown low valency phosphorus compounds and are odorless. The whiteness of the products is always greater than 90%.

(4) Phosphite solutions having a relatively high content of organic substances can be converted to pure white alkali metal phosphates.

(5) Complete oxidation occurs at relatively low temperatures (400°-500° C.). The residence time in the oxidative spray-drying process is extremely short compared to the oxidation of the alkali metal phosphite in a rotary kiln (where it is greater than 20 min).

(6) The alkali metal phosphates obtained have a very uniform degree of condensation, that is to say the content of the particular phosphate is greater than 90% by weight.

The present process proves highly beneficial for the preparation of pentasodium triphosphate, which is obtained at relatively low spray-drying temperatures (<450° C.).

In those cases in which the spray solutions used for making alkali metal polyphosphates contain at most 75% by weight, based on the total phosphorus, the gas issuing from the spray-drying unit always contains less than 1 ppm of phosphane. Otherwise, the issuing gas may contain up to 70 ppm of phosphane.

The skilled artisan would not have expected the present process to produce the beneficial effects described hereinabove, for the following reasons. In the prior processes, it has been necessary to use strong oxidizing agents, such as nitrates, chlorates and peroxides, even for the oxidation of small quantities of phosphite in alkali metal phospate solutions.

In addition to this, in order successfully to oxidize phosphate-phosphite mixtures in a rotary kiln by means of air, it has been necessary heretofore to use feed material consisting predominantly of phosphates, and to subject the reaction product to heat treatment at temperatures of 600°–900° C. In view of this, it is a greatly unexpected result of this invention that it is possible for phosphites, or phosphate-phosphite mixtures with a high proportion of phosphite therein, to be converted to pure phosphates in extremely short reaction times without the need to use expensive oxidizing agents.

The following Examples illustrate the process of this invention.

EXAMPLE 1: (Comparative Example)

Per hour, about 100 liters of a sodium phosphite/sodium phosphate solution, which contained about 9% by weight of $P^{3+}$ and 0.4% by weight of $P^{5+}$ (95.7% by weight of phosphite) and 0.08% by weight of organic carbon, and in which an Na:P atomic ratio of 2:1, theoretically necessary for the formation of tetrasodium diphosphate, had been established, was sprayed at a temperature of 430° C., near the head of a spray-drying tower. The resulting product had a yellow coloration and smelled of phosphane. Based on the total amount of phosphorus, the sodium diphosphate content was 84.5% by weight and the sodium phosphite content 12% by weight; the whiteness was 76%, measured against analytical-grade magnesium oxide.

EXAMPLE 2

The procedure was as in Example 1, but a sodium phosphite/sodium phosphate solution containing about 6% by weight of $P^{3+}$ and 3% by weight of $P^{5+}$ (66.7% by weight of phosphite) was employed, under otherwise identical conditions. In this case, the resulting product was pure white and colorless. The whiteness was 95.6%, the salt was practically phosphite-free and the content of diphosphate was greater than 95%.

EXAMPLE 3: (Comparative Example)

Per hour, 150 liters of a sodium phosphite/sodium phosphate solution, which contained about 11% by weight of $P^{3+}$ and 0.3% by weight of $P^{5+}$ (96.5% by weight of phosphite) and 0.04% by weight of organic carbon, and in which an Na:P atomic ratio of 1.67:1, theoretically necessary for the formation of pentasodium triphosphate, had been established, was sprayed, at a temperature of 455° C. The resulting product had a yellow coloration and smelled of phosphane; its whiteness was 90%. Based on the total amount of phosphorus, the product contained 77% by weight of sodium triphosphate together with 11.6% by weight of diphosphate and 10.3% by weight of higher phosphates.

EXAMPLE 4

The procedure was as in Example 3, but a sodium phosphite/sodium phosphate solution containing about 6% by weight of $P^{3+}$ and 4.5% by weight of $P^{5+}$ (57.1% by weight of phosphite) was employed, under otherwise identical conditions, the off-gas temperature being 390° C. The resulting product was pure white, odorless and phosphite-free. The whiteness was 95%, the content of triphosphate was greater than 96%, and the proportion of phase I was between 75 and 85% by weight; the bulk density was about 600 g/l.

EXAMPLE 5: (Comparative Example)

Per hour, 100 liters of a sodium phosphite/sodium phosphate solution, which contained about 7% by weight of $P^{3+}$, 0.25% by weight of $P^{5+}$ and 0.04% by weight of organic carbon, and in which an Na:P atomic ratio of 3:1, theoretically necessary for the formation of trisodium phosphate, had been established, was sprayed, at a temperature of 480° C. The resulting salt had a grey coloration; the whiteness was less than 70%. On dissolving the salt in water, black flocks were found to be formed. The product contained 75% by weight of trisodium phosphate and 22% by weight of sodium phosphite, based on the total amount of phosphorus. 800 ppm of hydrogen were found in the gas issuing from the spray tower.

EXAMPLE 6

The procedure was as in Example 5, a sodium phosphite/sodium phosphate solution, which contained 6% by weight of $P^{3+}$ and 0.2% by weight of $P^{5+}$ and in which an Na:P atomic ratio of 4:1 was established, was employed under otherwise identical conditions. And odorless, pure white, practically phosphite-free salt mixture of trisodium phosphate and sodium hydroxide in the atomic ratio of 1:1 was obtained; the whiteness was 90%. 0.34% of hydrogen were found in the gas issuing from the spray tower.

All the products were practically anhydrous. The $PH_3$ contents in the gas issuing from the spray tower are listed in the Table which follows:

| Example | $PH_3$ content in ppm |
| --- | --- |
| 1 | 50 |
| 2 | 0.5 |
| 3 | 70 |
| 4 | 0.1 |
| 5 | 0.1 |
| 6 | 0.1 |

We claim:

1. A process for oxidizing alkali metal phosphites in the form of solutions or suspensions containing the phosphorus in its trivalent oxidation state, which comprises spray-drying the said solutions or suspensions being essentially free of oxidizing agents other than air at a temperature between 400° and 500° C. in a flame zone within a tower and in the presence of an excess of air, with the resultant formation of trialkali metal phosphate admixed with alkali metal hydroxide as the product, said phosphate containing phosphorus in its pentavalent oxidation state, said solutions or suspensions being substantially phosphate free, having an alkali metal:P atomic ratio of at least about 3.5, and containing more than 50% by weight of the phosphorus in its trivalent oxidation state, prior to oxidation.

2. A process for oxidizing, to alkali metal polyphosphates containing the phosphorus in its pentavalent oxidation state, alkali metal phosphites in the form of solutions or suspensions containing the phosphorus in its trivalent oxidation state, which comprises spray-drying the said solutions or suspensions being essentially free of oxidizing agents other than air at a temperature between 400° and 500° C. in a flame zone within a tower and in the presence of an excess of air, with the resultant formation of alkali metal polyphosphates as the product, said solutions or suspensions containing, prior to oxidation, more than 50% by weight of the phosphorus in its trivalent oxidation state, and from 25 to 45% by weight of alkali metal phosphate calculated as phosphorus and based on the total phosphorus content of said solutions or suspensions.

3. The process as claimed in claim 1 or claim 2, wherein the feed materials used contain organic substances in proportions of up to 3% by weight, calculated as carbon, based on the phosphorus contained in the feed materials.

* * * * *

UNITED STATES PATENT AND TRADEMARK OFFICE
CERTIFICATE OF CORRECTION

PATENT NO. : 4,368,179
DATED : January 11, 1983
INVENTOR(S) : GUNTHER SCHIMMEL ET AL It is certified that error appears in the above-identified patent and that said Letters Patent is hereby corrected as shown below:

ON THE COVER SHEET OF THE PATENT:

The names of the inventors should read:

-- Gunther Schimmel, Gero Heymer, Hasso Spott --

Also in the heading under "UNITED STATES PATENT"

"Shimmel et al" should read -- Schimmel et al --.

Signed and Sealed this

Seventh Day of June 1983

[SEAL]

Attest:

DONALD J. QUIGG

Attesting Officer     Acting Commissioner of Patents and Trademarks